US012576521B2

(12) United States Patent
Dong et al.

(10) Patent No.: US 12,576,521 B2
(45) Date of Patent: Mar. 17, 2026

(54) TEACHING DEVICE FOR MOBILE MANIPULATOR BASED ON MOBILE ROBOT AND COLLABORATIVE ROBOT AND METHOD FOR SETTING INTERFACE THEREOF

(71) Applicant: Electronics and Telecommunications Research Institute, Daejeon (KR)

(72) Inventors: Jeyoun Dong, Daejeon (KR); Seung Woo Nam, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 174 days.

(21) Appl. No.: 18/538,283

(22) Filed: Dec. 13, 2023

(65) Prior Publication Data

US 2024/0286276 A1     Aug. 29, 2024

(30) Foreign Application Priority Data

Feb. 24, 2023     (KR) ........................ 10-2023-0024784

(51) Int. Cl.
   *B25J 9/16*        (2006.01)
   *B25J 5/00*        (2006.01)
(52) U.S. Cl.
   CPC .............. *B25J 9/163* (2013.01); *B25J 5/007* (2013.01); *B25J 9/161* (2013.01)
(58) Field of Classification Search
   None
   See application file for complete search history.

(56) References Cited

U.S. PATENT DOCUMENTS

| | | | |
|---|---|---|---|
| 9,393,690 B2 | 7/2016 | Lee et al. | |
| 11,577,402 B2 * | 2/2023 | Wang ..................... | B25J 9/0084 |
| 2014/0297034 A1 | 10/2014 | Lee | |
| 2016/0199975 A1 * | 7/2016 | Brooks ............... | G05B 19/427 700/248 |
| 2017/0197308 A1 * | 7/2017 | Azuma ................... | B25J 9/163 |
| 2021/0018912 A1 | 1/2021 | Dymesich et al. | |
| 2024/0255956 A1 * | 8/2024 | Miyagawa ............. | B25J 9/1666 |
| 2025/0229425 A1 * | 7/2025 | Kubo ..................... | B25J 9/1682 |

FOREIGN PATENT DOCUMENTS

| | | |
|---|---|---|
| KR | 10-2008-0038865 A | 5/2008 |
| KR | 10-2020-0015340 A | 2/2020 |
| KR | 10-2212478 B1 | 2/2021 |
| KR | 10-2022-0118105 A | 8/2022 |

* cited by examiner

*Primary Examiner* — Arslan Azhar
(74) *Attorney, Agent, or Firm* — NSIP Law

(57)     ABSTRACT

Provided is a teaching device for a mobile manipulator based on a mobile robot and a collaborative robot. The teaching device includes a communication unit that transmits/receives data to and from the mobile manipulator, a memory that stores a program providing an interface for performing a task of the mobile manipulator, and a processor that operates a teaching program that performs map creation and autonomous setting for the mobile robot, and setting necessary for robot manipulation for the collaborative robot on the same interface.

10 Claims, 6 Drawing Sheets

Figure 4:
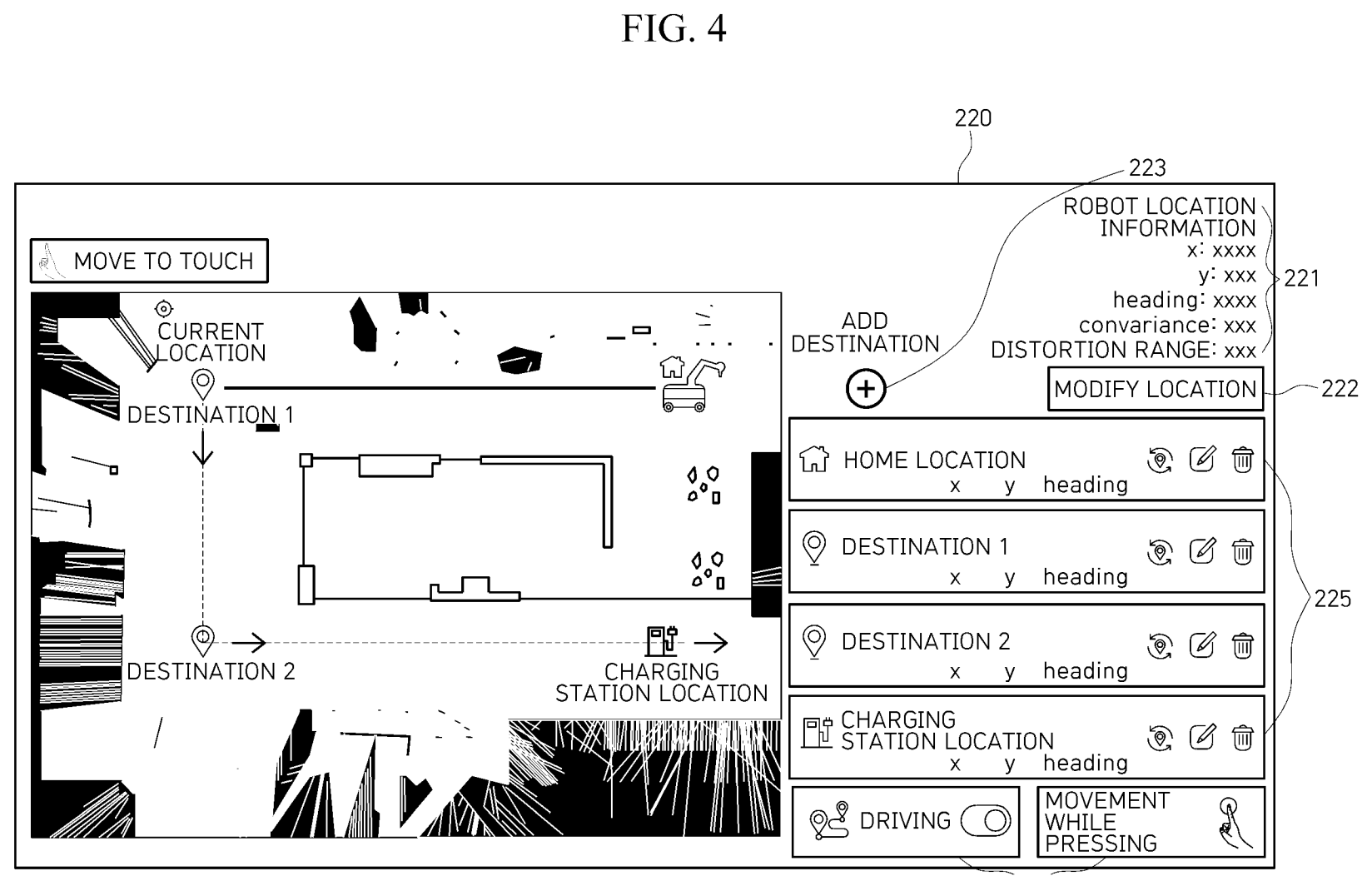

ADD
DESTINATION

221

ROBOT LOCATION
INFORMATION
x: xxxx
y: xxx
heading: xxxx
convariance: xxx
DISTORTION RANGE: xxx

222

MODIFY LOCATION

225

HOME LOCATION
x    y    heading

DESTINATION 1
x    y    heading

DESTINATION 2
x    y    heading

CHARGING
STATION LOCATION
x    y    heading

MOVEMENT
WHILE
PRESSING

DRIVING

MOVE TO TOUCH

CURRENT
LOCATION

DESTINATION 1

DESTINATION 2

CHARGING
STATION LOCATION

FIG. 5

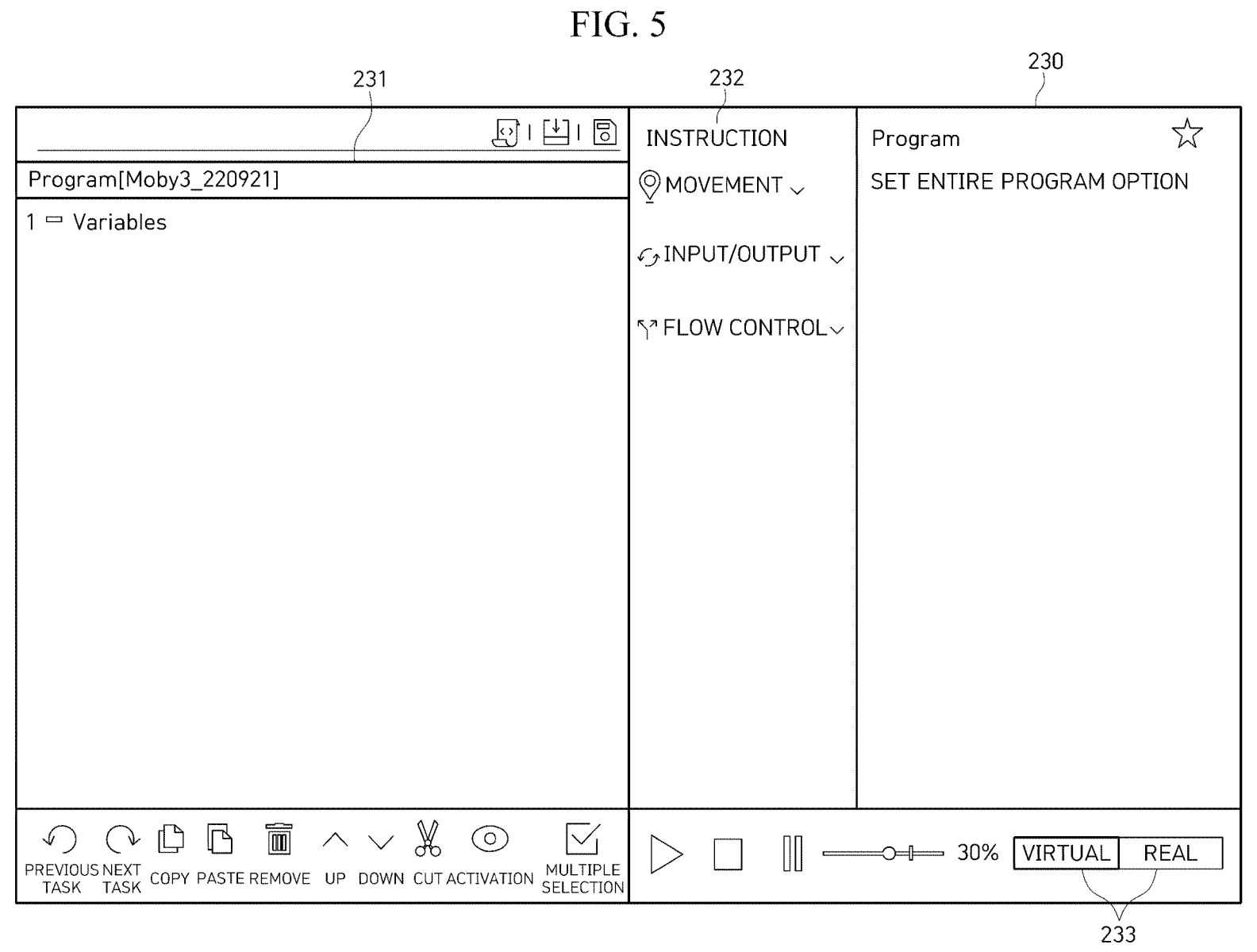

Program[Moby3_220921]

1 ⌐ Variables

231

232

INSTRUCTION

◎ MOVEMENT ∨

↺ INPUT/OUTPUT ∨

↱ FLOW CONTROL ∨

230

☆

Program

SET ENTIRE PROGRAM OPTION

△ ⬜ ☰ ─⬤─ 30% | VIRTUAL | REAL |

233

↺ ↻ 🗗 🗐 ‹ › ✂ ⊙ ☑
PREVIOUS NEXT COPY PASTE REMOVE UP DOWN CUT ACTIVATION MULTIPLE
TASK TASK SELECTION

TEACHING DEVICE FOR MOBILE MANIPULATOR BASED ON MOBILE ROBOT AND COLLABORATIVE ROBOT AND METHOD FOR SETTING INTERFACE THEREOF

CROSS-REFERENCE TO RELATED APPLICATION

This application claims priority to and the benefit of Korean Patent Application No. 10-20230024784, filed on Feb. 24, 2023, the disclosure of which is incorporated herein by reference in its entirety.

BACKGROUND

1. Field

The present invention relates to a teaching device for a mobile manipulator based on a mobile robot and a collaborative robot, and a method for setting an interface thereof.

2. Description of Related Art

Recently, a mobile manipulator in which a collaborative robot (vertical multi-joint robot) and an automated guided vehicle (AGV) are combined is on the rise.

In order to perform the tasks of the mobile manipulator, the mobile robot and the collaborative robots should create respective tasks. Most mobile robots typically create a map, then set a path that includes a home location, a charging location, and a destination, and follow the path. And the collaborative robots create tasks through teaching.

Therefore, global companies tend to develop simple teaching technologies that help workers to easily use robots in consideration of the situations in which teaching of robots is done by teaching pendants. Easy programming UI is based on icons and timelines, and thus, even users who are not familiar with robot programming can program a collaborative robot with only half a day of training and can check task programs in advance through 3D simulation or monitor the task programs in real time.

The mobile robot creates a map using a simultaneous localization and mapping (SLAM) technology that estimates the location of the robot simultaneously with drawing the map. This means that the robot moves around and creates a map on its own with data obtained through sensors. Navigation is a way to find a desired path with the map created in this way. The navigation refers to a system that presents a possible method when a target point is set and automatically moves to that point. In this case, the navigation includes procedures of sensing-location estimation (localization, pose estimation)-motion planning-movement/obstacle avoidance.

However, since the task creation of the mobile robot and the collaborative robot is not currently performed in one device, there is a problem in that a user has to separately perform teaching in order to perform the task in each of the mobile robot and the collaborative robot. That is, even if the path is created in the form of the autonomous driving in the mobile robot, a user does not have a teaching pendant for the mobile robot, the user (including a robot expert or operator) should add the final destination and waypoint on the PC. Apart from this, the collaborative robots require users to create their own tasks using direct teaching or teaching pendants.

SUMMARY

The present invention provides a teaching device for a mobile manipulator based on a mobile robot and a collaborative robot and a method for setting an interface thereof, which enable both a mobile robot and a collaborative robot to perform tasks at the same time.

However, the problems to be solved by the present invention are not limited to the problems described above, and other problems may be present.

According to an aspect of the present invention, a teaching device for a mobile manipulator based on a mobile robot and a collaborative robot includes: a communication unit that transmits/receives data to and from the mobile manipulator; a memory that stores a program providing an interface for performing a task of the mobile manipulator; and a processor that operates a teaching program that performs map creation and autonomous setting for the mobile robot, and setting necessary for robot manipulation for the collaborative robot on the same interface.

According to another aspect of the present invention, a method of setting an interface for a mobile manipulator based on a mobile robot and a collaborative robot in a teaching device includes: performing a communication connection with the mobile manipulator; monitoring state information of the mobile manipulator; receiving a menu selection input for performing a task by the mobile manipulator; and performing, through a teaching program, map creation and autonomous setting for the mobile robot, and setting necessary for robot manipulation for the collaborative robot on the same interface in response to the menu selection input.

According to still another aspect of the present invention for solving the above problems, a computer program executes a method of setting an interface for a mobile manipulator based on a mobile robot and a collaborative robot in a teaching device, and is stored in a computer readable recording medium.

Other specific details of the invention are included in the detailed description and drawings.

BRIEF DESCRIPTION OF DRAWINGS

FIG. 2 is a diagram illustrating an example of an interface main screen according to an embodiment of the present invention.

FIG. 4 is a diagram for describing an autonomous function through an interface according to an embodiment of the present invention.

FIG. 5 is a diagram for describing setting functions necessary for robot manipulation of a collaborative robot through an interface according to an embodiment of the present invention.

DETAILED DESCRIPTION

Figure 1:
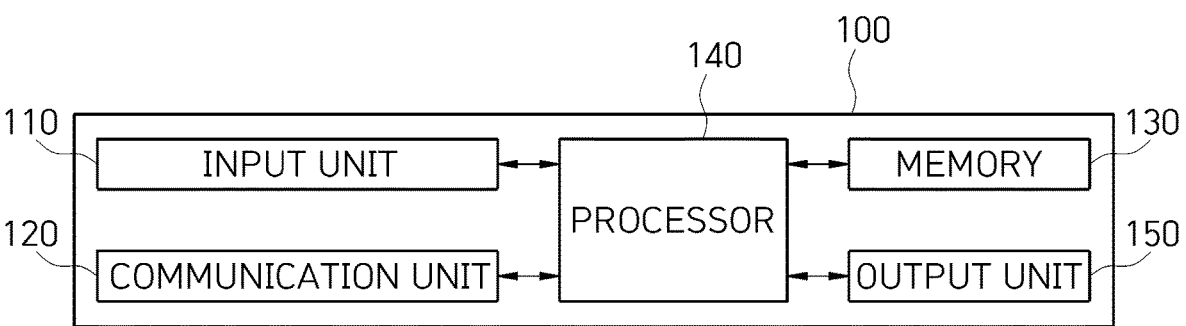
FIG. 1 is a diagram for describing a teaching device for a mobile manipulator according to an embodiment of the present invention.

Various advantages and features of the present invention and methods accomplishing them will become apparent from the following description of embodiments with reference to the accompanying drawings. However, the present invention is not limited to embodiments to be described below, but may be implemented in various different forms, these embodiments will be provided only in order to make the present invention complete and allow those skilled in the art to completely recognize the scope of the present invention, and the present invention will be defined by the scope of the claims.

Terms used in the present specification are for illustrating embodiments rather than limiting the present invention. Unless otherwise stated, a singular form includes a plural form in the present specification. Throughout this specification, the term "comprise" and/or "comprising" will be understood to imply the inclusion of stated constituents but not the exclusion of any other constituents. Like reference numerals refer to like components throughout the specification and "and/or" includes each of the components mentioned and includes all combinations thereof. Although "first," "second," and the like are used to describe various components, it goes without saying that these components are not limited by these terms. These terms are used only to distinguish one component from other components. Therefore, it goes without saying that the first component mentioned below may be the second component within the technical scope of the present invention.

Unless defined otherwise, all terms (including technical and scientific terms) used in the present specification have the same meanings commonly understood by those skilled in the art to which the present invention pertains. In addition, terms defined in commonly used dictionary are not ideally or excessively interpreted unless explicitly defined otherwise.

Hereinafter, the background to which the present invention was conceived will be described to help those skilled in the art understand, and then the present invention will be described in detail.

The present invention relates to a teaching device for a mobile manipulator based on a mobile robot and a collaborative robot, and a method for setting an interface thereof.

In order to perform tasks of existing mobile robots and collaborative robots, unlike teaching using each device, the present invention may provide a single device for teaching a mobile manipulator and provide an interface capable of teaching all tasks of collaborative robots and mobile robots in one device.

In the era of industrialization based on a mass production system of small items, it was essential to introduce expensive industrial robots from a long-term perspective in order to mass-produce standardized products through repetitive tasks. However, as the flexibility of the manufacturing line is emphasized under the consumer-oriented small quantity production of multi-products, the need for collaborative robots is increasing. In addition, because collaborative robots are cheaper than industrial robots, small and medium-sized businesses may also introduce the collaborative robots.

One of the reasons why the collaborative robots are emerging recently is that they are converging with new technologies. In addition to the advantage that humans and robots may operate in one space without a fence (safety fence) for the safety of workers, as new technologies such as vision systems, artificial intelligence algorithms, mobility, and end effects are converged with collaborative robots, the potential of the collaborative robots is growing.

In particular, the combination of the collaborative robots and the mobility is attracting attention. In the meantime, it has been common for the collaborative robots to be installed in one place, but as mobility is secured, a 'pick & place' function is emerging as a key function.

A mobile manipulator for this purpose is essential equipment for securing productivity and quality of intelligent autonomous factories. Various processes such as parts transportation, product assembly, and inspection may be performed while a vertical articulated robot and an automated guided vehicle are combined to move through a mapped area such as a production line in a factory.

In addition, in the warehouse, it is possible to perform an operation of picking up a product and bringing the product to a worker in charge of dispatching, and in the production line, it is possible to bring the necessary parts to the workers. As such, the mobile manipulator is introduced and used not only for manufacturing and logistics, but also for repetitive laboratory tasks such as moving medicines or samples while autonomously moving inside laboratories, hospitals, and research institutes.

Meanwhile, in order to operate such a field at a manufacturing site, an operator most often uses a teaching pendant of a robot to perform functions such as path creation of a robot path, self-made and teaching modification, system operation, and periodic robot maintenance management.

There are several processes for the operation of the mobile robot and the collaborative robot. In the mobile robot, there are map creation, destination creation in autonomous driving, waypoint creation, and simulator, and in the collaborative robot, there is teaching for the robot operation. In this case, the teaching refers to a task in which an operator records movement in a robot, and records a passing point (waypoint) of a tool mounted at an end of a robot in the robot using the teaching pendant attached to the robot.

However, in general, operators at a manufacturing site should simultaneously perform the tasks of the path creation including the maintenance creation of the destination and path of the mobile robot and the teaching of the collaborative robot. In order to operate these two types of robots, training for the path creation such as the map creation and the autonomous driving and training for coding complex teaching programs are required. Otherwise, there are cases in which a robot expert is called to perform a task each time to perform coding for performing the task.

In order to solve this problem, an embodiment of the present invention provides a teaching device for a mobile manipulator that enables a mobile robot and a collaborative robot to simultaneously perform tasks. Even if a user is not an expert, an interface that can be directly manipulated is provided, and an interface considering ease, convenience, and ease of use may be provided so that the teaching and modification of the robot may be facilitated.

Hereinafter, a teaching device 100 for a mobile manipulator based on a mobile robot and a collaborative robot (hereinafter referred to as a teaching device for a mobile manipulator) according to an embodiment of the present invention will be described with reference to FIG. 1.

FIG. 1 is a diagram for describing a teaching device 100 for a mobile manipulator according to an embodiment of the present invention.

The teaching device 100 for a mobile manipulator according to the embodiment of the present invention includes an input unit 110, a communication unit 120, a display unit 130, a memory 140, and a processor 150.

The input unit 110 generates input data in response to an input of the teaching device 100 for a mobile manipulator. The input in this case may be a user input for controlling the mobile manipulator through the interface, and the control may be an input through the interface for manipulating the mobile manipulator. The input unit 110 includes at least one input means. The input unit 110 may include a keyboard, a key pad, a dome switch, a touch panel, a touch key, a mouse, a menu button, and the like.

The communication unit 120 transmits/receives data to and from the mobile manipulator, transmits/receives data between internal components, or communicates with an external device such as an external server. The communication unit 120 may include both a wired communication module and a wireless communication module. The wired communication module may be implemented as a power line communication device, a telephone line communication device, cable home (MoCA), Ethernet, IEEE1294, an integrated wired home network, and an RS-485 control device. In addition, the wireless communication module may be configured in a module for implementing functions such as wireless LAN (WLAN), Bluetooth, HDR WPAN, UWB, ZigBee, Impulse Radio, 60 GHz WPAN, Binary-CDMA, wireless USB technology and wireless HDMI technology, 5th (5G) generation communication, long term evolution-advanced (LTE-A), long term evolution (LTE), and wireless fidelity (Wi-Fi).

The display unit 130 displays display data (map display, path display, status display, etc.) according to the operation and input of the teaching device 100 for a mobile manipulator. The display unit 130 may include a liquid crystal display (LCD), a light emitting diode (LED) display, an organic LED (OLED) display, a micro electro mechanical systems (MEMS) display, and an electronic paper display. The display unit 130 may be coupled with the input unit 110 and implemented as a touch screen.

The memory 140 stores programs providing the interface for performing the task of the mobile manipulator. Here, the memory 140 collectively refers to a non-volatile storage device that continuously maintains stored information even when power is not supplied and a volatile storage device. For example, the memory 140 may include NAND flash memories such as a compact flash (CF) card, a secure digital (SD) card, a memory stick, a solid-state drive (SSD), and a micro SD card, magnetic computer storage devices such as a hard disk drive (HDD), and optical disc drives such as CD-ROM and DVD-ROM.

The processor 150 may execute software such as a program to control at least one other component (e.g., hardware or software component) of the teaching device 100 for a mobile manipulator, and may perform various data processing or calculations.

Hereinafter, details performed by the processor 150 in an embodiment of the present invention will be described in detail.

The processor 150 performs map creation for a mobile robot and setting for autonomous driving on a single same interface, and also operates a teaching program that performs settings necessary for robot manipulation for a collaborative robot.

Figure 2:
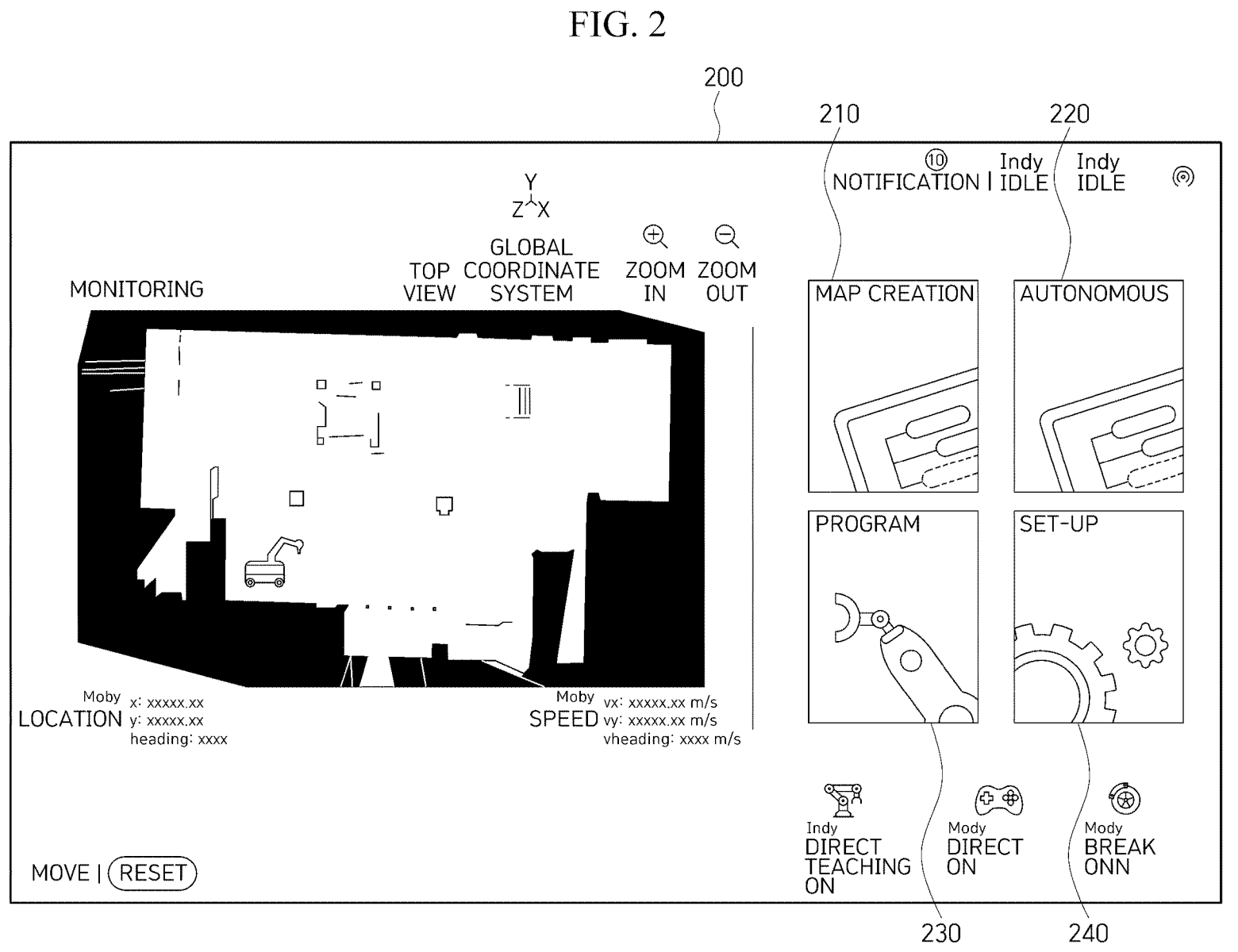

FIG. 2 is a diagram illustrating an example of an interface main screen according to an embodiment of the present invention.

The processor 150 may provide a map creation function 210 for a mobile manipulator, an autonomous function 220, a teaching program setting function 230, and other setting functions 240 through a main screen 200 of the interface.

As an embodiment, the processor 150 may provide a result of monitoring state information of the mobile manipulator through the main screen 200 of the interface.

In this case, the state information may include at least one of location information, path information, and task state information of the mobile manipulator and current connection state information between the mobile robot and the collaborative robot.

In addition, the processor 150 may set on/off setting for direct teaching of the mobile manipulator, on/off setting of a joystick for controlling the mobile robot, and on/off setting of a brake of the mobile robot to a frequent writing function through the main screen 200 of the interface, and display the set function in a certain area on the interface.

In addition, the processor 150 may display notification information through the main screen 200 of the interface, and may provide an input button for moving the mobile manipulator to a home location and resetting the robot.

Figure 3:
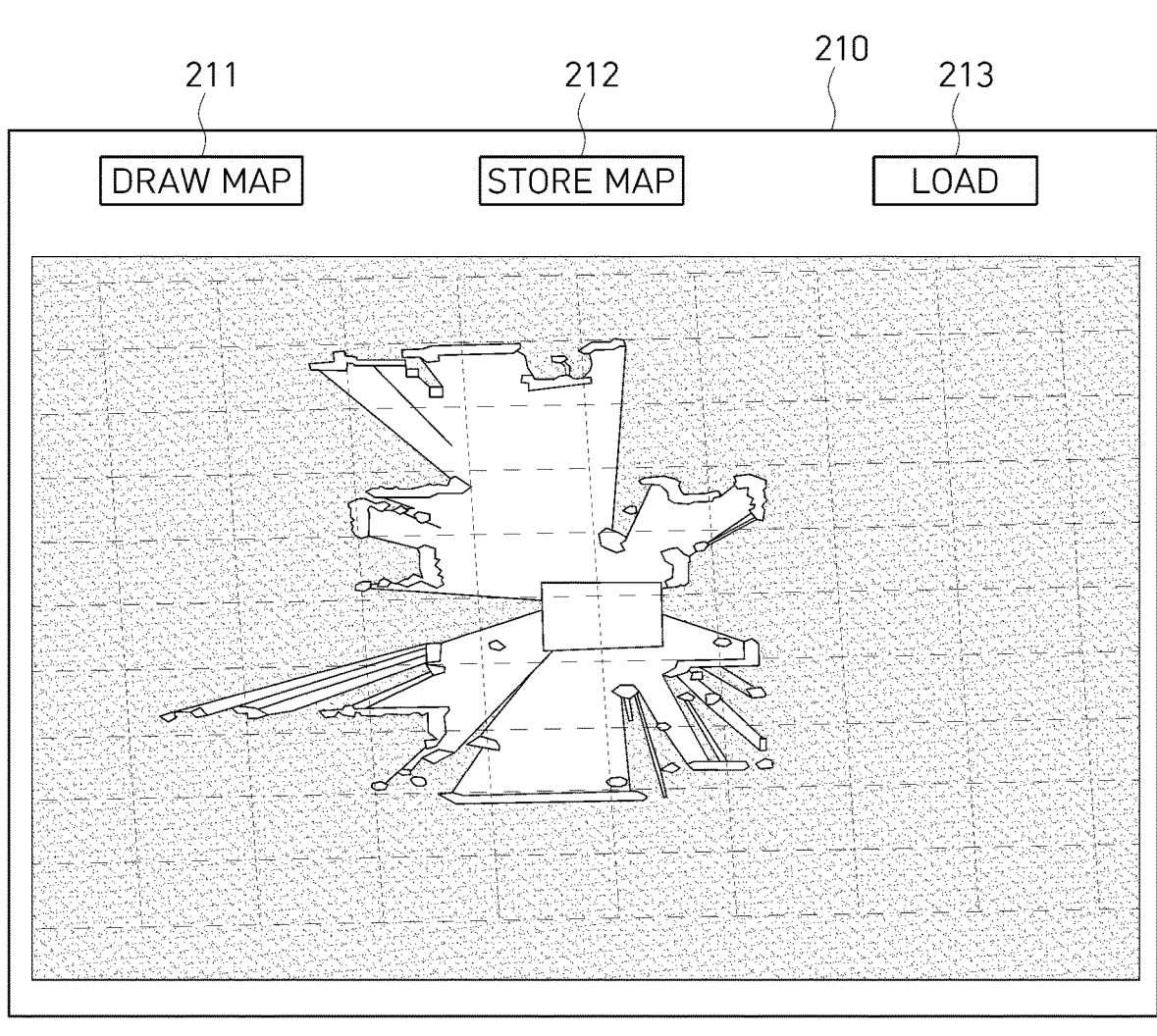
FIG. 3 is a diagram for describing a map creation function through an interface according to an embodiment of the present invention.

FIG. 3 is a diagram for describing a map creation function through an interface according to an embodiment of the present invention.

In an embodiment, the processor 150 may create a map of a task target space corresponding to the input location using a predetermined input device as the menu related to the map creation function 210 of the mobile robot is selected and input on the interface (211). In this case, as the input device, a joystick or a keypad may be used.

In addition, when a map that has been previously created or is being created is stored (212), the processor 150 may read the corresponding map according to a user's selection input (213). In this case, at least one of location, movement speed, map size, and resolution information of the mobile manipulator may be displayed on the read map. Meanwhile, the correction of the generated map can be performed through a separate application on the web.

FIG. 4 is a diagram for describing an autonomous function through an interface according to an embodiment of the present invention.

As an embodiment, the processor 150 may provide the location information of the mobile robot as a menu for autonomous driving of the mobile robot is selected and input on the interface (220). In this case, the location information may include at least one of (x, y) coordinates, a heading value, a covariance, and a distortion range (221).

Then, the processor 150 determines whether the location of the mobile robot on the created map matches the actual location of the mobile robot, and when there is an error of more than a predetermined range (for example, 1 m), the processor may perform the location correction (222).

Also, the processor 150 may add at least one destination input through a destination addition input button (+) of the mobile robot provided on the interface (223). In this case, when setting the destination, direction information setting corresponding to the added destination may be received together with a notification "Please set a direction at a touched location."

In an embodiment, the processor 150 may provide path information corresponding to destinations created so far through a map when receiving a path movement input (moving while pressing) provided on the interface, and may issue a command to move the mobile robot according to the path information as a driving input is received (224).

In addition, the processor 150 may include a special destination including a home location and a charging location of the mobile robot in a destination list by default (225), and when the location of the mobile robot is changed, update the location through a location update button input. In addition, the destination may be displayed on the created map, and a trajectory (passed path and moving path) of the mobile robot may be displayed.

FIG. 5 is a diagram for describing setting functions necessary for robot manipulation of a collaborative robot through an interface according to an embodiment of the present invention.

As an embodiment, when a menu for setting necessary for the robot operation of the collaborative robot is selected and input on the interface (230), the processor 150 may control to create a new task of the collaborative robot, or read a previously created task or a task being created to execute the task through the collaborative robot.

As an embodiment, the processor 150 may define a movement instruction, an input/output instruction, and a flow control instruction for the task, respectively, and control the manipulation of the collaborative robot based on each defined instruction (232). In this case, the movement instruction includes a special destination list and a general destination, and may include a command to move to a destination selected from the destination list added in autonomous driving, a speed control instruction when moving to the destination, and the like. The input/output instructions may include instructions for digital signal output (DO), analog signal output (AO), tool input, and variable assignment. Also, the flow control instructions may include instructions such as conditional statements, wait, and loop.

In addition, the processor 150 may execute the created task through virtual simulation, and may also execute the created task in an actual mobile robot or collaborative robot. The processor 150 obtains and compares a first simulation result for a first task and a first task execution result to add, change, or delete instructions for the task (233).

Hereinafter, a method for setting an interface for a mobile manipulator in a teaching device according to an embodiment of the present invention will be described with reference to FIG. 6.

Figure 6:
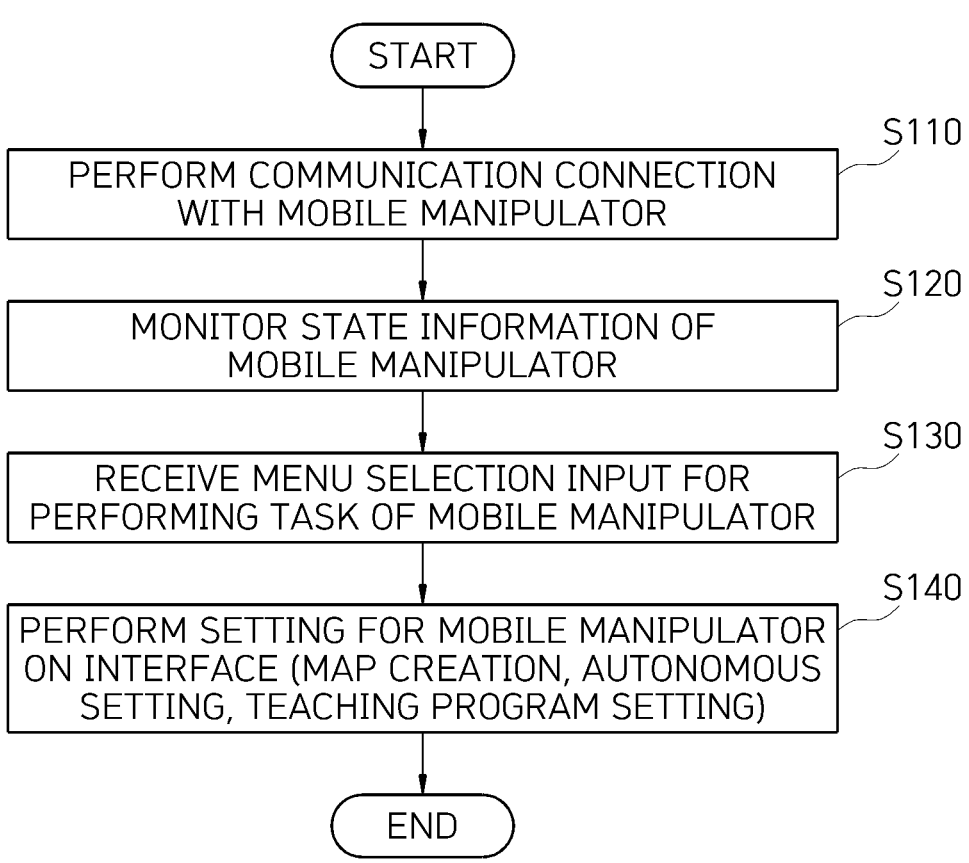
FIG. 6 is a flowchart of a method for setting an interface for a mobile manipulator according to an embodiment of the present invention.

FIG. 6 is a flowchart of a method for setting an interface for a mobile manipulator according to an embodiment of the present invention.

First, a communication connection with the mobile manipulator is performed (S110).

Next, the state information of the mobile manipulator is monitored (S120), and a menu selection input for performing the task of the mobile manipulator is received (S130).

Next, the map creation and autonomous driving setting for the mobile robot, and the setting necessary for robot manipulation for the collaborative robot on the same interface in response to the menu selection input are performed through a teaching program (S140).

Meanwhile, in the above description, steps S110 to S140 may be further divided into additional steps or combined into fewer operations according to an implementation example of the present invention. Also, some steps may be omitted if necessary, and an order between the operations may be changed. In addition, even if other content is omitted, the content described in FIGS. 1 to 5 and the content described in FIG. 6 may be mutually applied.

The method for setting an interface for a mobile manipulator based on a mobile robot and a collaborative robot in a teaching device according to an embodiment of the present invention described above may be implemented as a program (or application) to be executed in combination with a computer, which is hardware, and stored in a medium.

In order for the computer to read the program and execute the methods implemented as the program, the program may include a code coded in a computer language such as C, C++, JAVA, Ruby, Python, or machine language that the processor (CPU, GPU) of the computer may read through a device interface of the computer. Such code may include functional code related to a function or such defining functions necessary for executing the methods and include an execution procedure related control code necessary for the processor of the computer to execute the functions according to a predetermined procedure. In addition, the code may further include a memory reference related code for which location (address street number) in an internal or external memory of the computer the additional information or media necessary for the processor of the computer to execute the functions is to be referenced at. In addition, when the processor of the computer needs to communicate with any other computers, servers, or the like located remotely in order to execute the above functions, the code may further include a communication-related code for how to communicate with any other computers, servers, or the like using the communication module of the computer, what information or media to transmit/receive during communication, and the like.

The storage medium is not a medium that stores images therein for a while, such as a register, a cache, a memory, or the like, but means a medium that semi-permanently stores the images therein and is readable by an apparatus. Specifically, examples of the storage medium include, but are not limited to, ROM, random-access memory (RAM), CD-ROM, a magnetic tape, a floppy disk, an optical image storage device, and the like. That is, the program may be stored in various recording media on various servers accessible by the computer or in various recording media on the computer of the user. In addition, media may be distributed in a computer system connected by a network, and a computer-readable code may be stored in a distributed manner.

According to one embodiment of the present invention described above, it is possible to provide an interface capable of generating tasks of a mobile robot and a collaborative robot in one device. In other words, by providing an intuitive interface to perform tasks such as robot manipulation and teaching required for robot operation, provision of a programming interface for modification of taught tasks, map creation, creation of destinations and waypoints in autonomous driving, setting, simulator, monitoring, and notification, it is easy to use and it is possible to increase convenience by safely performing functions suitable for a mobile manipulator.

The effects of the present invention are not limited to the above-described effects, and other effects that are not mentioned may be obviously understood by those skilled in the art from the following description.

The above description of the present invention is for illustrative purposes, and those skilled in the art to which the present invention pertains will understand that it may be easily modified to other specific forms without changing the technical spirit or essential features of the present invention. Therefore, it should be understood that the above-mentioned embodiments are exemplary in all aspects but are not limited thereto. For example, each component described as a single type may be implemented in a distributed manner, and similarly, components described as distributed may be implemented in a combined form.

It is to be understood that the scope of the present invention will be defined by the claims rather than the above-described description and all modifications and alternations derived from the claims and their equivalents are included in the scope of the present invention.

What is claimed is:

1. A teaching device for a mobile manipulator based on a mobile robot and a collaborative robot, the teaching device comprising:

a communication unit that transmits/receives data to and from the mobile manipulator;

a memory that stores a program providing an interface for performing a task of the mobile manipulator; and a processor that operates a teaching program that performs map creation and autonomous setting for the mobile robot, and setting necessary for robot manipulation for the collaborative robot on the same interface, wherein as a menu for autonomous driving of the mobile robot is selected and input on the interface, the processor provides location information of the mobile robot, determines whether the generated map and the location of the mobile robot are matched, and then performs location modification when there is an error beyond a certain range, wherein the processor adds at least one destination input through a destination addition input button of the mobile robot provided on the interface, and receives setting of direction information corresponding to the added destination during movement, and wherein as a path movement input provided on the interface is received, the processor provides path information corresponding to a destination created so far through the map, and as a driving input is received, the processor commands the mobile robot to move according to the path information.

2. The teaching device of claim 1, wherein the processor monitors state information of the mobile manipulator, and the state information includes at least one of location information, path information, and task state information of the mobile manipulator and current connection state information between the mobile robot and the collaborative robot.

3. The teaching device of claim 1, wherein the processor sets at least one of on/off setting for direct teaching of the mobile manipulator, on/off setting of a joystick for controlling the mobile robot, and brake on/off setting of the mobile robot to a frequent write function, and displays the set function in a certain area on the interface.

4. The teaching device of claim 1, wherein the processor creates a map of a task target space corresponding to an input location using a predetermined input device as a menu related to the map creation of the mobile robot is selected and input on the interface.

5. The teaching device of claim 4, wherein the processor reads a corresponding map according to a user's selection input when there is a previously created map or a map currently being created, and displays at least one of location, movement speed, map size, and resolution information of the mobile manipulator on the read map.

6. The teaching device of claim 1, wherein the processor includes a special destination including a home location and a charging location of the mobile robot in a destination list by default.

7. The teaching device of claim 1, wherein as a menu for setting necessary for robot operation of the collaborative robot is selected and input on the interface, the processor controls to create a new task of the collaborative robot or read a previously created task or a task being created to execute the read task through the collaborative robot.

8. The teaching device of claim 7, wherein the processor executes the task through virtual simulation and executes the task in an actual mobile robot and collaborative robot.

9. The teaching device of claim 7, wherein the processor defines a movement instruction, an input/output instruction, and a flow control instruction for the task, respectively, and controls the manipulation of the collaborative robot based on each defined command.

10. A processor-implemented method of setting an interface for a mobile manipulator based on a mobile robot and a collaborative robot in a teaching device, the method comprising:

performing a communication connection with the mobile manipulator;

monitoring state information of the mobile manipulator;

receiving a menu selection input for performing a task by the mobile manipulator;

performing, through a teaching program, map creation and autonomous setting for the mobile robot, and setting necessary for robot manipulation for the collaborative robot on the same interface in response to the menu selection input, providing location information of the mobile robot, as a menu for autonomous driving of the mobile robot is selected and input on the interface;

determining whether the generated map and the location of the mobile robot are matched, and then performing location modification when there is an error beyond a certain range;

adding at least one destination input through a destination addition input button of the mobile robot provided on the interface;

receiving setting of direction information corresponding to the added destination during movement;

providing path information corresponding to a destination created so far through the map, as a path movement input provided on the interface is received; and commanding the mobile robot to move according to the path information as a driving input is received.

* * * * *